Patented Aug. 10, 1948

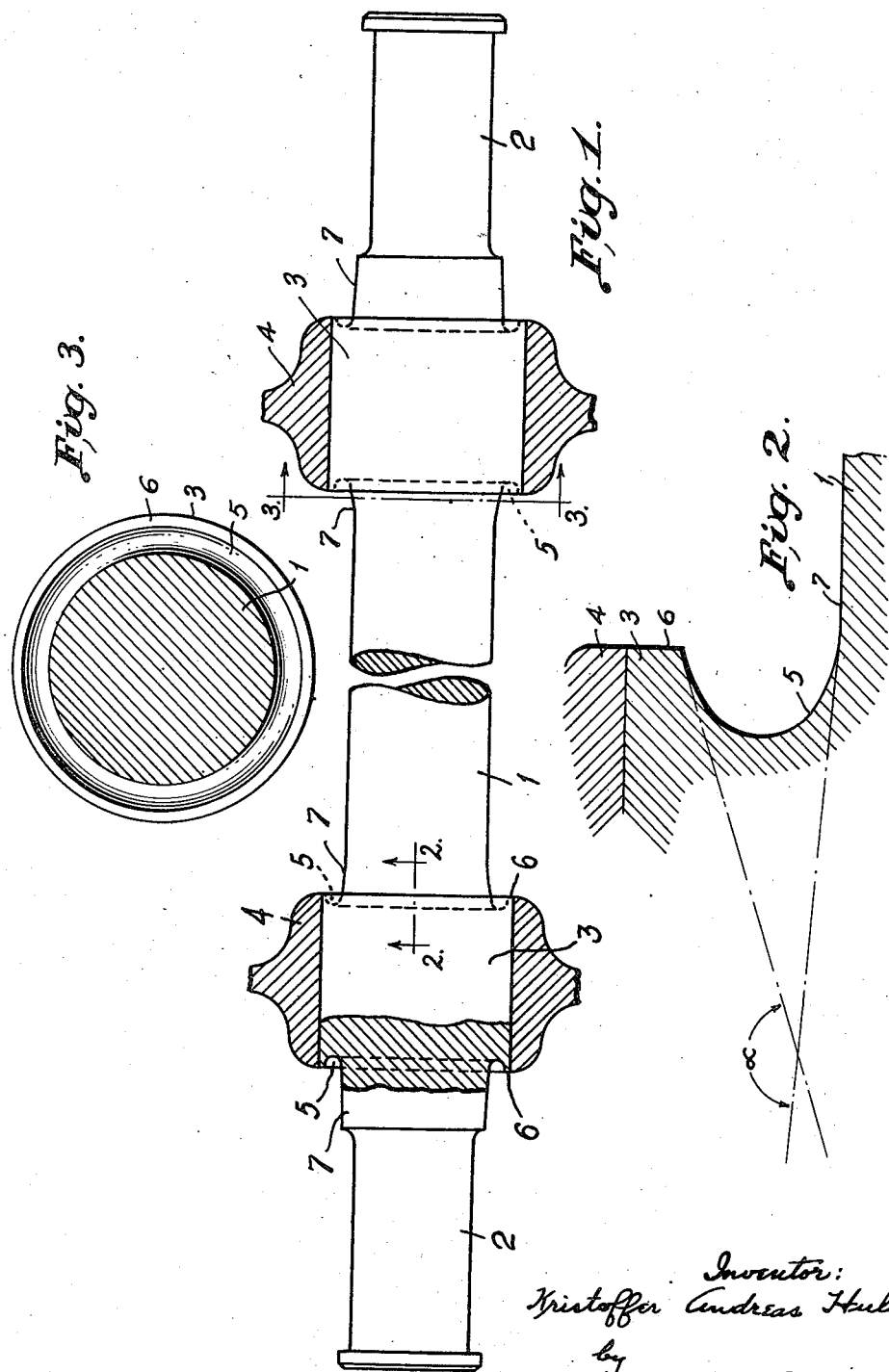

2,446,592

UNITED STATES PATENT OFFICE 2,446,592

CAR WHEEL AXLE

Kristoffer Andreas Huldt, Stockholm, Sweden

Application August 5, 1943, Serial No. 497,499
In Sweden July 30, 1942

Section 1, Public Law 690, August 8 1946
Patent expires July 30, 1962

5 Claims. (Cl. 295—43)

The car wheel axles which are generally used for railway cars are in the form of solid axles of a substantially uniform thickness. At the places where the wheel hubs are secured to the axle, the latter has a somewhat enlarged portion onto which the hubs are forced. The radial pressures occurring as a result of this method of securing the wheels to the axle, are added to the stresses occurring when the car is running and cause a maximum moment acting in a plane through the inner side face of the hub with the result that the resistance of the axle is reduced at said plane. In addition thereto, moisture can easily intrude into the outermost portion of the joint between the axle and the hub, thus giving rise to corrosion which results in the formation of cracks at the points of the axle where the same is subject to the greatest stresses.

The present invention has for its object to provide a car wheel axle having an increased resistance, due to the fact that the above-named detrimental accumulation of stresses is prevented from occurring in the most critical section of the axle, that is, in a plane through the inner side face of the hub. This and other objects are obtained by a novel construction of the axle, a suitable embodiment of which is illustrated in the accompanying drawing in which Fig. 1 is a fragmentary elevation of a car wheel axle, with the wheel hubs and a part of the axle shown in section;

Fig. 2 is an enlarged fragmentary section on a plane through the axis of the wheel axle, as indicated by line 2—2 of Fig. 1; and Fig. 3 is a transverse section as seen on the plane indicated by line 3—3 of Fig. 1.

In the drawing, reference numeral 1 denotes the middle portion of a car wheel axle. The ends of the axle are formed to journals 2. Numeral 3 indicates an exactly cylindrical portion having a somewhat greater diameter and forming a support for the hub 4 of the car wheel not shown in the drawing. The portion 3 has the same axial length as the hub, and its diameter is slightly greater than the inner diameter of the hub so that the hub when forced onto the portion 3 will be secured thereto merely on account of the radial pressure and the friction against the cylindrical surface of the portion 3.

In accordance with the present invention, the axle is under cut at both end surfaces of the radially enlarged portions 3 by rounded grooves 5 which are of annular form, as viewed axially of the wheel axle, see Fig. 3, and which have a circumferential length of more than 90° and preferably between 120° and 170°, as measured by the external angle α between tangents to the ends of the grooves 5 as viewed in a plane through the axis of the wheel axle, see Fig. 2. The outer edge of each groove 5 is spaced inwardly from the outer cylindrical surface of the axle enlargements 3 by an annular flange 6, and the inner edges of the grooves merge into the portions 7 of the axle. At the portions of the joints located around the flanges 6 between the hub and the portion 3, a relatively small amount of the stresses occurring in operation will be transmitted from the hub to the axle. Consequently, intruding moisture will not result in the formation of detrimental cracks. The section subject to the maximum stresses occurring in operation is located approximately in a plane through the inner portion of the groove 5 or somewhat nearer to the center of the portion 3, that is, at a place where corrosion will not occur. Near this section, no discontinuous changes of the radial forces will occur, which also contributes to the increase of the resistance of the axle.

It will be understood that the invention may be applied not only to axles for railway cars, but also to all kinds of wheels where the hubs of the wheels are secured to the axles by pressure.

What I claim is:

1. A solid car wheel axle having radially enlarged cylindrical portions on which wheels may be pressed, both end surfaces of each cylindrical portion being undercut by circumferential grooves whose inner edges merge into the adjacent portions of the axle.

2. A solid car wheel axle as recited in claim 1 wherein the outer edges of said grooves are spaced from the periphery of the associated cylindrical portion by annular surfaces.

3. A solid car wheel axle as recited in claim 1, wherein said annular grooves are rounded as viewed on a sectional plane through the axis of the wheel axle and have an angular length as measured between tangents of the ends of the grooves and in said sectional plane of between 120° and 170°.

4. A car wheel assembly comprising a wheel axle having a radially enlarged cylindrical portion, and a wheel hub pressed onto said cylindrical portion, the end surfaces of said cylindrical portion being undercut by annular grooves whose inner edges merge into the adjacent portions of said axle.

5. A car wheel assembly comprising a wheel axle having a radially enlarged cylindrical portion, and a wheel hub pressed onto said cylindrical portion, the end surfaces of said cylindrical portion being undercut by annular grooves whose outer edges are spaced from the periphery of the cylindrical portion by an annular surface and whose inner edges merge into the adjacent portions of said axle.

KRISTOFFER ANDREAS HULDT.

REFERENCES CITED

The following references are of record in the file of this patent:

UNITED STATES PATENTS

| Number | Name | Date |
| --- | --- | --- |
| 740,976 | Gerbing | Oct. 6, 1903 |
| 2,031,818 | Buckwalter | Feb. 25, 1936 |
| 2,082,379 | Brittain | June 1, 1937 |